Dec. 29, 1953  W. P. BURTON ET AL  2,664,435
SEPARATION OF ORGANIC COMPOUNDS
Filed Dec. 26, 1946
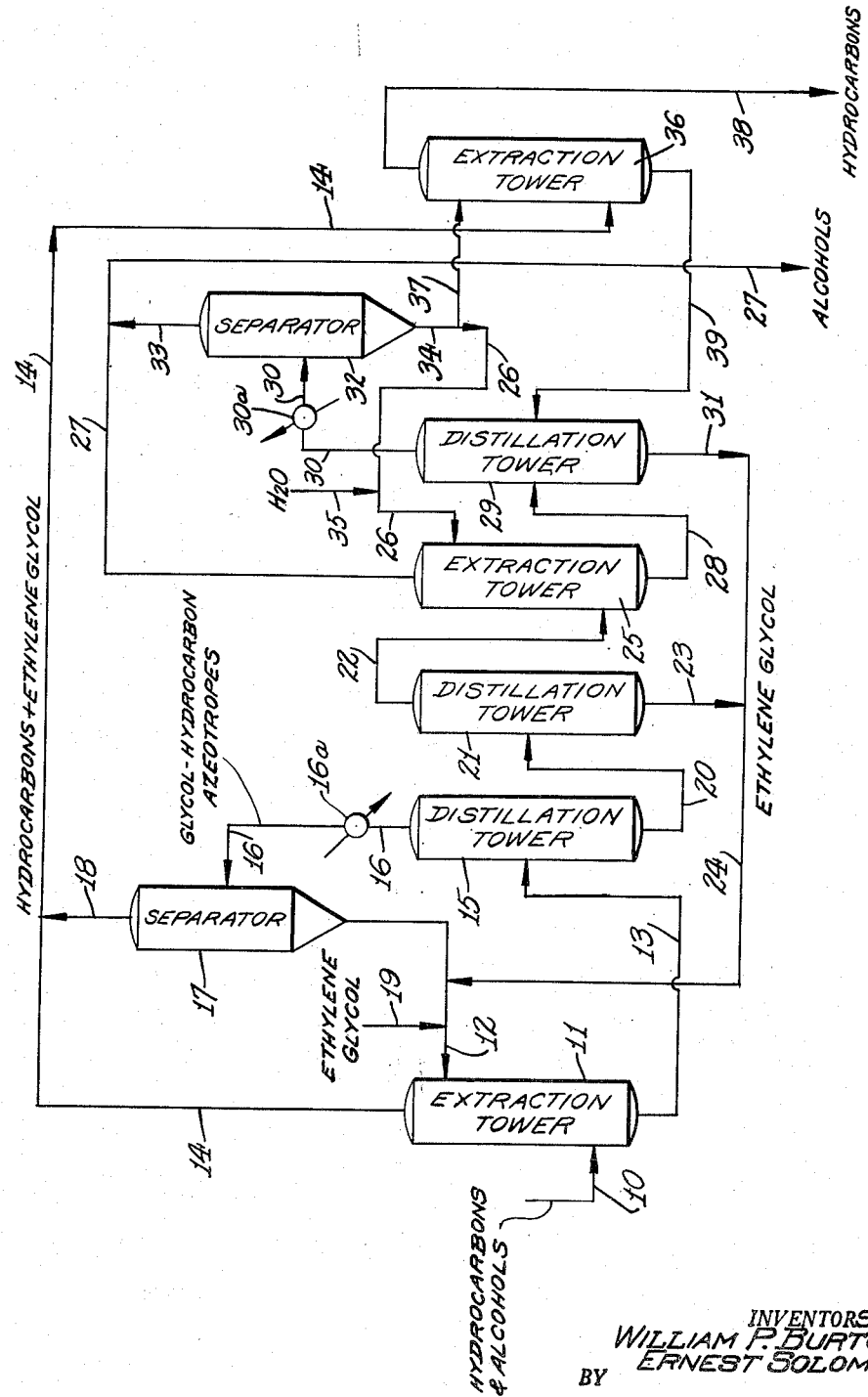
INVENTORS
WILLIAM P. BURTON
ERNEST SOLOMON
BY
E. F. Liebrecht
ATTORNEY Patented Dec. 29, 1953

2,664,435

UNITED STATES PATENT OFFICE 2,664,435

SEPARATION OF ORGANIC COMPOUNDS

William P. Burton, Orange, and Ernest Solomon, Nutley, N. J., assignors to The M. W. Kellogg Company, Jersey City, N. J., a corporation of Delaware Application December 26, 1946, Serial No. 718,584

9 Claims. (Cl. 260—450)

This invention relates to the separation of organic compounds and relates more particularly to a process for separating alcohols and hydrocarbons from mixtures thereof. Still more particularly the invention relates to a process for separating alcohols and hydrocarbons from mixtures thereof such as are obtained in the catalytic hydrogenation of oxides of carbon at elevated temperatures.

In the catalytic hydrogenation of oxides of carbon at elevated temperatures, the product of the reaction is substantially in vapor form as it comes from the reactor at temperatures varying between approximately 300° F. to 700° F. This product is subsequently condensed to obtain a mixture of condensate and uncondensed gases. The condensate thus obtained separates into a lower aqueous phase and an upper oil phase. When this oil phase is water-scrubbed, there are absorbed in the water those oxygenated organic compounds present in the oil which are relatively more soluble in water, such as low boiling alcohols, ketones and aldehydes. Preferably, the scrubbed oil is next treated with alkali to convert organic acids contained in the oil to their corresponding salts, to polymerize aldehydes and to saponify esters. The mixture thus obtained is next contacted with water in quantities sufficient to effect separation of the oil from alkali and other reaction products and also to dissolve in the water, alcohols including butanol and lighter alcohols. The resulting mixture is next subjected to settling action to separate this mixture into a lower aqueous phase containing water, unreacted alkali, salts of organic acids, low boiling alcohols and aldehyde polymers and an upper oil phase which is subsequently fractionated into four relatively narrow boiling fractions.

The lightest fraction obtained from the above mentioned fractionation, contains constituents boiling up to about 200° F., is relatively free of oxygenated compounds and contains no alcohols boiling above butanol. The highest boiling fraction contains constituents higher boiling than about 430° F. A relatively light intermediate fraction boiling between about 200° F. and about 310° F. is obtained, containing in addition to hydrocarbons, alcohols having five or six carbon atoms per molecule. There is also obtained a relatively heavy intermediate fraction boiling between about 310° F. and about 430° F., containing in addition to hydrocarbons, alcohols having seven or more carbon atoms per molecule.

It is an object of this invention to provide a process for separating alcohols, having seven or more carbon atoms per molecule, and hydrocarbons from mixtures thereof having an initial boiling point above 310° F. It is a further object of the invention to provide a process for effecting efficient and economical separation of alcohols from hydrocarbons in the aforementioned relatively heavy intermediate fraction which boils between about 310° F. and about 430° F. and which comprises $C_7$ and higher alcohols and hydrocarbons. Another object of this invention is to separate pure alcohols in an anhydrous state from hydrocarbons present in the aforementioned fraction by selective separation employing a single, relatively non-volatile polar solvent. Other objects and advantages will be apparent during the course of the following more detailed disclosure.

It has been found that the use of a selective polar solvent of the glycol type in accordance with the present process, in addition to its desirability as a single selective solvent, has the added advantage of permitting economical and efficient separation of anhydrous $C_7$ and higher alcohols from hydrocarbons present in mixtures thereof which have an initial boiling point above about 310° F. It has also been found that the glycols such as ethylene glycol, form low boiling azeotropic mixtures with many organic compounds including hydrocarbons and aliphatic alcohols and when these glycols are used as selective solvents, substantial separation of the components of a mixture of alcohols having seven or more carbon atoms per molecule and hydrocarbons is possible. This is explained by the fact that azeotropic glycol-hydrocarbon mixtures generally boil considerably lower than azeotropic mixtures of equally high boiling alcohols with a glycol. Particular advantage is attained, in that azeotropic mixtures of hydrocarbons thus derived, contain a considerably higher concentration of hydrocarbons than the concentration of alcohols in equally high boiling azeotropic mixtures of the above-mentioned alcohols.

While we prefer to use ethylene glycol as an overall generally suitable polar solvent in accordance with the process of our invention as hereinafter set forth, it should be noted that the invention is not limited solely to its use. In selecting a suitable glycol solvent treating agent for separating alcohols from hydrocarbons present in a given hydrocarbon fraction, optimum results are obtained in employing a glycol whose boiling point is below that of the lowest boiling hydrocarbon present in the mixture, where the initial boiling point of the mixture is above about 310° F. When the boiling point of the treating agent is approximately equal to or above the boiling point of the lowest boiling hydrocarbon component present in the mixture, some alcohols present may distill over with the glycol-hydrocarbon azeotropes formed. Hence, in addition to ethylene glycol as a solvent treating agent in accordance with the process of our invention, other glycol solvents may be successfully employed such as 1,3-butanediol, 1,6-hexanediol, diethylene glycol, isopropylene glycol, triethylene glycol, trimethylene glycol and the like.

The accompanying drawing illustrates, diagrammatically, one form of the apparatus employed and capable of carrying out one embodiment of the process of our invention. While the invention will be described in detail by reference to one embodiment of the process employing the apparatus illustrated in the drawing, it should be noted that it is not intended that the invention be limited to the embodiment as illustrated, but is capable of other embodiments which may extend beyond the scope of the apparatus illustrated in the drawing. Pumps, compressors, valves and other mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art.

Referring to the drawing, a hydrocarbon-alcohol mixture, comprising a relatively heavy intermediate fraction boiling between about 310° F. and about 430° F., prepared by distillation of the total oil obtained from the reaction product derived in the catalytic hydrogenation of oxides of carbon at elevated temperatures, is supplied through line 10. This mixture contains in addition to hydrocarbons, alcohols having seven or more carbon atoms per molecule. The mixture thus supplied through line 10 is transferred to a low point in an extraction tower 11. In tower 11, the mixture introduced through line 10 is subjected to intimate countercurrent contact with a selective polar solvent, such as ethylene glycol, as a treating agent, which is introduced into tower 11 at an upper point through line 12. The treating agent and the mixture are contacted in tower 11 under conditions effective to absorb in the treating agent a large proportion of the alcohols contained in the hydrocarbon-alcohol stream passing through line 10. The extract thus produced is withdrawn from the bottom of tower 11 through line 13. The hydrocarbons treated in tower 11 absorb small amounts of the ethylene glycol or other selective polar solvent treating agent and are passed overhead as a raffinate through line 14 for further treatment in the process hereinafter described.

The extract from the bottom of tower 11, comprising a mixture of the glycol solvent treating agent, $C_7$ and higher alcohols and proportionately small quantities of hydrocarbons, is transferred through line 13 to a distillation tower 15. In tower 15 the extract is heated under conditions of temperature and pressure effective to distill overhead, hydrocarbons present as their glycol azeotropes which are withdrawn through line 16, cooled in a cooler 16a and transferred to a separator 17. In the latter separation of the glycol-hydrocarbon azeotropes is effected into an upper phase comprising hydrocarbons and small quantities of the glycol treating agent and a lower phase comprising the glycol treating agent and a relatively small amount of alcohols that may be distilled as their glycol azeotropes. The upper phase in separator 17 is withdrawn overhead through line 18 and transferred into line 14, with which line 18 connects, for further treatment in the process hereinafter described. The lower phase in separator 17, comprising the glycol treating agent and small amounts of alcohols, is transferred through line 12 into tower 11. Make-up treating agent is supplied through line 19.

The bottoms obtained from distillation tower 15, comprise a mixture of alcohols having seven or more carbon atoms per molecule and also comprise proportionately large quantities of the glycol treating agent. These bottoms are transferred through line 20 to a distillation tower 21. In tower 21 the mixture is heated under conditions of temperature and pressure effective to distill overhead, alcohols present through line 22. Bottoms from tower 21, comprising proportionately large quantities of the glycol treating agent, are withdrawn through line 23, passed through line 24 into line 12 and are thus returned to the system for reuse.

The overheads from tower 21, comprising alcohols having seven or more carbon atoms per molecule and small amounts of the glycol treating agent, are withdrawn through line 22 and transferred to a low point in an extraction tower 25. In tower 25 the alcohol stream introduced through line 22, is subjected to intimate countercurrent contact with water, regulated to introduce sufficient quantities to remove the glycol treating agent from alcohols present. Water so used, is transferred into tower 25 at an upper point through line 26. Following countercurrent contact in tower 25 between the alcohol stream containing the glycol treating agent and the introduced water, separation is effected between an upper alcohol phase, comprising alcohols having seven or more carbon atoms per molecule and a lower water phase, comprising chiefly water containing small amounts of the glycol treating agent and small quantities of $C_7$ and higher alcohols. The alcohol phase thus obtained in tower 25, comprising $C_7$ and higher alcohols in a pure state, is withdrawn overhead through line 27 and recovered for further use outside the scope of the present process.

The lower aqueous phase from tower 25, containing small amounts of the glycol treating agent, and small amounts of $C_7$ and higher alcohols, comprises the extract obtained from subjecting the alcohol stream introduced into tower 25 through line 22, to countercurrent extraction with water. The extract thus produced, is withdrawn from the bottom of tower 25 through line 28 and is transferred to a distillation tower 29. In tower 29, the aqueous glycol-alcohol extract from tower 25 is heated under conditions of temperature and pressure effective to dehydrate the glycol solvent. As a result of distillation in tower 29, an overhead is obtained comprising an aqueous alcohol mixture containing $C_7$ and higher alcohols which is withdrawn through line 30. Bottoms from tower 29, comprising water-free glycol solvent, are transferred through line 31 into line 24 with which line 31 connects. From line 24 the glycol solvent is transferred through line 12, with which line 24 connects, and is thus employed as the treating agent in tower 11 as described above.

The overhead from tower 29, comprising an aqueous alcohol mixture containing $C_7$ and higher alcohols, is transferred through line 30, cooled in a cooler 30a and passed into a separator 32.

In the latter, the mixture transferred through line 30 is separated into an upper alcohol phase and a lower aqueous phase. The upper alcohol phase in separator 32, comprising $C_7$ and higher alcohols, is transferred through line 33 into line 27 through which these alcohols are recovered for further use outside the scope of the present process. The lower water phase in separator 32 is withdrawn as bottoms through line 34 and transferred into line 26 for use in tower 25 as an extraction agent in the process hereinbefore described. Make-up water is supplied through line 35.

The overhead from tower 11, comprising hydrocarbons containing small quantities of absorbed glycol treating agent, as previously described, is transferred from tower 11 through line 14. The overhead from separator 17, comprising a hydrocarbon upper phase containing small quantities of the glycol treating agent, as previously described, is transferred from separator 17 through line 18 with which line 14 connects. The combined hydrocarbon-glycol mixture thus obtained, is transferred through line 14 to a low point in an extraction tower 36. In tower 36, the mixture introduced through line 14 is subjected to intimate countercurrent contact with water as a treating agent which is introduced into tower 36 at an upper point through line 37. Water thus employed, may conveniently be a portion of the water phase withdrawn as bottoms from separator 32 through line 34, as previously described. The hydrocarbon-glycol mixture and the water are contacted in tower 36 under conditions effective to absorb in the water, substantially all of the glycol solvent present in the mixture passing through line 14. As a result of the extraction process in tower 36, an upper hydrocarbon or oil layer and a lower aqueous glycol layer are produced. The upper hydrocarbon layer from tower 36 is withdrawn as an overhead raffinate through line 38 for further use outside the scope of the present process. The extract from tower 36, comprising an aqueous glycol layer, is withdrawn as bottoms through line 39 and transferred to tower 29 for subsequent dehydration of the glycol treating agent in the manner previously described.

As described above, we have indicated that other glycol solvents, in addition to ethylene glycol, may be used as treating agents in accordance with the process of our invention. We have also indicated the use of ethylene glycol as an overall generally suitable polar solvent treating agent in the separation of $C_7$ and higher alcohols from hydrocarbons present in the aforementioned relatively heavy intermediate fraction boiling between about 310° F. and about 430° F. and prepared by distillation of the total oil obtained from the reaction product derived in the catalytic hydrogenation of oxides of carbon at elevated temperatures. However, we have also found that in instances where alcohol-hydrocarbon mixtures contain $C_9$ and higher alcohols, most efficient separation of these alcohols will be obtained by using 1,3-butanediol as a solvent treating agent. $C_9$ and higher alcohols boiling above approximately 416° F. are most efficiently separated by using 1,3-butanediol as a solvent which has a boiling point of approximately 399.2° F., and in accordance with the process of our invention represents a solvent which boils below the boiling point of the lowest boiling constituent in the aforementioned alcohol-hydrocarbon mixtures. Similarly, in instances where the alcohol-hydrocarbon mixture contains $C_{12}$ and higher alcohols, boiling above approximately 490° F., we have found that most efficient separation of these alcohols is obtained by using 1,6-hexanediol as the solvent treating agent which boils at approximately 482° F.

To recapitulate, our invention is directed to a process for separating $C_7$ and higher alcohols and hydrocarbons from mixtures thereof which are present in the reactor gases obtained in the catalytic hydrogenation of oxides of carbon at elevated temperatures. However, while the invention has particular applicability to the separation of such compounds from the source indicated, the process of the invention is not necessarily restricted to effect the desired separation of these compounds as derived from the aforementioned source. The process of the invention may also be successfully applied to the separation of any mixtures of the aforementioned compounds, without regard to the source from which these mixtures may have been derived and without regard to the relative proportions of components comprising such mixtures.

In addition, while we have described a particular embodiment of our invention, for purposes of illustration, it should be understood that various modifications and adaptations thereof, which will be obvious to one skilled in the art, may be made within the spirit of the invention as set forth in the appended claims.

Having thus described our invention, what we claim and desire to secure by Letters Patent is:

1. A process for treating a mixture comprising alcohols having at least 7 carbon atoms per molecule and hydrocarbons, said alcohols and hydrocarbons boiling between about 310° F. and about 430° F. and obtained in the catalytic hydrogenation of oxides of carbon, which comprises: subjecting said mixture to extraction treatment with a solvent comprising a glycol to obtain an extract comprising alcohols and a relatively small portion of said hydrocarbons, said hydrocarbons being present in azeotropic-forming proportions with said solvent, and a raffinate comprising the remainder of said hydrocarbons; recovering the extract thus formed; subjecting the extract thus recovered to distillation to form a relatively high boiling fraction comprising alcohols and a relatively low boiling fraction comprising azeotropes of said hydrocarbons and solvent; and separating hydrocarbons and solvent from said azeotropes.

2. The process of claim 1 in which the solvent comprises ethylene glycol.

3. The process of claim 1 in which the solvent is 1,3-butanediol.

4. The process of claim 1 in which the solvent is 1,6-hexanediol.

5. The process of claim 1 in which the solvent is diethylene glycol.

6. The process of claim 1 in which the solvent is isopropylene glycol.

7. A process for treating a mixture comprising alcohols having at least 7 carbon atoms per molecule and hydrocarbons, said alcohols and hydrocarbons boiling between about 310° F. and about 430° F. and obtained in the catalytic hydrogenation of oxides of carbon, which comprises: subjecting said mixture to extraction treatment with a solvent comprising a glycol to obtain an extract comprising alcohols and a relatively small portion of said hydrocarbons, said hydrocarbons being present in azeotropic-forming proportions with said solvent, and a raffinate comprising the remainder of said hydrocarbons; recovering the extract thus formed; subjecting the extract thus recovered to distillation to form a relatively high boiling fraction comprising alcohols and a relatively low boiling fraction comprising azeotropes of said hydrocarbons and solvent; separating hydrocarbons and solvent from said azeotropes; and passing solvent thus separated to said extraction treatment.

8. A process for treating a mixture comprising alcohols having at least 7 carbon atoms per molecule and hydrocarbons, said alcohols and hydrocarbons boiling between about 310° F. and about 430° F. and obtained in the catalytic hydrogenation of oxides of carbon, which comprises: subjecting said mixture to extraction treatment with a solvent comprising a glycol to obtain an extract comprising alcohols and a relatively small portion of said hydrocarbons, said hydrocarbons being present in azeotropic-forming proportions with said solvent, and a raffinate comprising the remainder of said hydrocarbons; recovering the extract thus formed; subjecting the extract thus recovered to distillation to form a relatively high boiling fraction comprising alcohols and a relatively low boiling fraction comprising azeotropes of said hydrocarbons and solvent; separating hydrocarbons and solvent from said azeotropes; combining hydrocarbons and a portion of the solvent separated from said azeotropes with said raffinate; and subjecting the combined mixture to extraction treatment with water to obtain an aqueous extract comprising solvent and a raffinate comprising hydrocarbons.

9. A process for treating a mixture comprising alcohols having at least 7 carbon atoms per molecule and hydrocarbons, said alcohols and hydrocarbons boiling between about 310° F. and about 430° F. and obtained in the catalytic hydrogenation of oxides of carbon, which comprises: subjecting said mixture to extraction treatment with a solvent comprising a glycol to obtain an extract comprising alcohols and a relatively small portion of said hydrocarbons, said hydrocarbons being present in azeotropic-forming proportions with said solvent, and a raffinate comprising the remainder of said hydrocarbons; recovering the extract thus formed; subjecting the extract thus recovered to distillation to form a relatively high boiling fraction comprising alcohols and a relatively low boiling fraction comprising azeotropes of said hydrocarbons and solvent; separating hydrocarbons and solvent from said azeotropes; passing solvent thus separated to said extraction treatment; combining hydrocarbons and a portion of the solvent separated from said azeotropes with said raffinate; and subjecting the combined mixture to extraction treatment with water to obtain an aqueous extract comprising solvent and a raffinate comprising hydrocarbons.

WILLIAM P. BURTON.
ERNEST SOLOMON.

References Cited in the file of this patent

UNITED STATES PATENTS

| Number | Name | Date |
| --- | --- | --- |
| 1,870,816 | Lewis | Aug. 9, 1932 |
| 2,002,533 | Frolich et al. | May 28, 1935 |
| 2,313,196 | Guinot | Mar. 9, 1943 |
| 2,348,191 | Camelford | May 9, 1944 |
| 2,360,685 | Jensen | Oct. 17, 1944 |
| 2,410,642 | Farkas et al. | Nov. 5, 1946 |
| 2,470,782 | McGrath et al. | May 24, 1949 |

OTHER REFERENCES

U. S. Technical Mission in Europe, "The Synthesis of Hydrocarbons and Chemicals From CO and $H_2$," page 892, August 2, 1946.